United States Patent [19]

Kubo

[11] Patent Number: 5,538,371
[45] Date of Patent: Jul. 23, 1996

[54] TAPPER MECHANISM

[75] Inventor: Haruaki Kubo, Nara, Japan

[73] Assignee: Daishowa Seiki Co., Ltd., Osaka, Japan

[21] Appl. No.: 377,256

[22] Filed: Jan. 24, 1995

[51] Int. Cl.$^6$ .................................................. B23G 1/16
[52] U.S. Cl. ........................... 408/139; 192/21; 408/142; 470/103
[58] Field of Search ..................... 408/139, 141, 408/142; 470/103, 198; 192/21, 67

[56] References Cited

U.S. PATENT DOCUMENTS

| | | | |
|---|---|---|---|
| 3,051,013 | 8/1962 | Zagar | 408/139 |
| 4,277,209 | 7/1981 | Benjamin et al. | 408/139 |
| 4,722,643 | 2/1988 | Johnson | 408/142 |
| 4,832,542 | 5/1989 | Johnson et al. | 408/139 |

*Primary Examiner*—Daniel W. Howell
*Attorney, Agent, or Firm*—Schweitzer Cornman & Gross

[57] ABSTRACT

A tapper mechanism having (i) a rotatable tapper body with a clutch, (ii) a driven shaft having a portion rotatably held coaxially in the tapper body for limited axial motion therein, (iii) an engageable claw connected from the driven shaft for selective engagement with the driven shaft for selectively transmitting torque from the tapper body to the driven shaft upon the axial movement of the driven shaft within the tapper body the transmission of torque from the tapper body to the driven shaft is interrupted by the disengagement of the clutch and the driven shaft is axially moved into a neutral state, (iv) a tap connected from an end of the driven shaft that is remote from the tapper body, (v) an engaging slider disposed between the driven shaft and the engageable claw, the engageable claw and the driven shaft being adapted to rotate together and are axially displaceable relative to each other within the tapper body during such rotation, and (vi) a clutch spring urging the engageable claw away from the clutch.

7 Claims, 6 Drawing Sheets

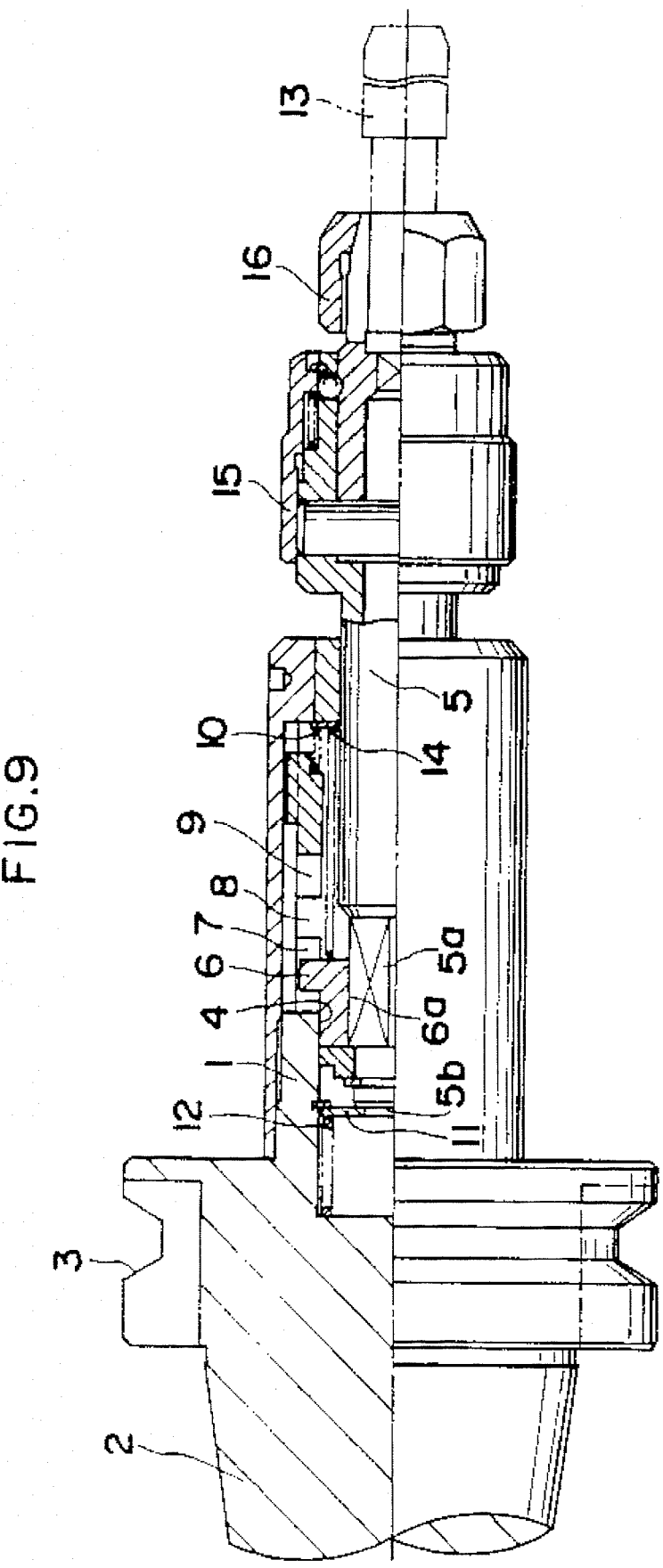

TAPPER MECHANISM

FIELD OF THE INVENTION

The present invention relates to an improvement in a tapping attachment for a machine tool to tap a screw thread into a workpiece, such as metal workpiece.

BACKGROUND OF THE INVENTION

As the background of this invention, the prior art is illustrated in FIGS. 9 and 10. A tapper body 1 has at its rear end a shank 2 and a flange-shaped fitting 3 which is to be gripped by a manipulator. The shank 2 is to be connected to a driving shaft (not shown) of a machine tool. A large-diameter axial bore 4 is formed in the tapper body 1, and a driven shaft 5 fits in the bore to be slidable within the tapper body.

An engager 6 has a square bore 6a shaped to fit on a reduced size square 5a formed integral with the back end of the driven shaft 5. The engager 6 protrudes radially and is axially displaceable within the bore. A forward clutch 7 is disposed in contact with the periphery of the axial bore and protrudes thereinto, to engage the engager 6 when it is to be rotated normally forward. A neutral or free space 8 is provided in which the forward clutch 7 is not engageable with the engager 6, axially adjacent to and outwardly from the shank 2 in front of the clutch. A reverse clutch 9 is disposed also in contact with the periphery of the axial bore in front of or outwardly of the neutral space 8. The reverse clutch also protrudes into the bore to engage with the engager 6 when it has to rotate in the reverse direction. A small buffer spring 10 supports the reverse clutch 9 so that it can be rotated together with the tapper body 1 and to a slight extent remain axially displaceable.

A seat 11 selectively engaging an inner end surface 5b of the driven shaft 5 is within the axial bore 4 of the tapper body 1. An absorbing spring 12 functioning as a compression spring, is interposed between the seat 11 and the bottom of the axial bore 4 for absorbing any positioning error in the axial direction between an axially driving member in the machine tool and the tapper attached thereto and driven thereby. A recovery spring 14 functioning as a tension spring, is interposed between the forward end of the axial bore 4 and the engager 6 protruding radially and outwardly of the driven shaft 5. The recovery spring 14 urges the driven shaft toward its back end. A coupling 15 is at the forward end of the driven shaft 5, for enabling the selective attachment of a tap holder 16 carrying a tap 13 to the driven shaft.

In use of such a tapper mechanism, the flange-shaped fitting 3 protruding from the tapper body 1 is gripped by the manipulator, and the shank 2 is connected to the driving shaft of the machine tool for rotating the tapper body 1.

As the tapper body rotates, the engager 6 engages the forward clutch 7 so that the driven shaft 5 rotates forward and the tap 13 in the forward end of the shaft cuts a female screw thread into a workpiece. During this process, the driven shaft 5 is guided by and along the bore of the workpiece in which a thread is being tapped. Therefore, the driven shaft 5 advances forward by itself independently of the tapper body 1. When the thread in the bore in the workpiece is completed, the engager 6 disengages from the forward clutch 7 and enters the neutral space 8. Thus, a torque which was transmitted from the tapper body 1 to the driven shaft is intercepted to bring the shaft into its idle position. Next the drive shaft rotates the tapper body 1 in the reverse direction and thereby retracts it axially to a slight extent. As a result, the engager 6 leaves the neutral space 8 and comes into engagement with the reverse clutch 9. The driven shaft is now rotated in the reverse direction and the tap 13 is guided by and along the tapped bore in the workpiece, until it is completely withdrawn from the tapped bore.

FIG. 10 shows another known apparatus of an almost identical structure to that in FIG. 9 by using the same reference numerals for the same parts. A switch-over mechanism 17 is incorporated in the tapper body shown in FIG. 10 so that its reverse clutch 18 always rotates in reverse direction. Therefore, in contrast to the embodiment shown in FIG. 9, in this embodiment the driving shaft in the machine tool need not be switched over into reverse rotation.

A cover 19 is supported on an outer periphery of the tapper body 1, with bearings 20 separating the covers from the body. The cover 19 is maintained in its position by an anchor arm 21. A bevel gear 22 is journaled on a stud shaft secured to an inner periphery of the cover 19. The stud shaft extends perpendicularly to the axis of tapper body. The bevel gear 22 is meshed with a pair of geared portions 24 and 25. One of these portions 24 is integral with a forward clutch 23, while the other geared portion 25 is fixed to the reverse clutch 18. Therefore, the reverse clutch 18 always rotates in the opposite direction than the direction of rotation of the forward clutch 23. The driving shaft of this prior art tapper embodiment need not be reversed and, therefore, it can be more easily controlled.

In both of these prior art tapper embodiments shown in FIGS. 9 and 10, the engager 6 is in releasable engagement with the respective forward clutch 7 or 23, and travels axially together with the driven shaft 5. This structure often causes a problem when the engager 6, and thus, also the driven shaft 5, is changed from its position connected to the tapper body 1 by the forward clutch 7 or 23, to its idle or neutral position. This problem prevents the instantaneous disengagement of the engager 6 from the forward clutch and, thus causes a chattering between the clutch and the engager which is being disengaged therefrom. Such a chattering causes the premature wearing away and abrasion of these parts, and a reduced accuracy of the thread tapping activity. The chattering is repeated by the mating members when engaging with and disengaging from each other within short time periods. The tappers are usually installed in automated machine tools, and a predetermined distance is preset in them as an invariable machining stroke of the tapper body 1. The chattering thus impairs machining accuracy.

SUMMARY OF THE INVENTION

An object of the present invention is to provide a tapper mechanism comprising an engager which is protected from causing any chattering when the engager is in the process of disengaging, but has not yet fully disengaged, from a clutch. In accordance with the present invention, the engager is to be prevented from repeatedly engaging with and disengaging from the clutch within a brief time period to enable the engager to be positively switched from its operative position into its idle or neutral position.

The engager of the present invention is to be quickly displaceable from engagement with the clutch and, after disengagement, should be spaced a sufficient distance therefrom to avoid any erroneous contact therewith. No chattering should occur thus to avoid any premature abrasion between the engaging portions of the engager and the clutch.

The transmission of torque to a driven shaft rotating at a high speed can now be changed over between its operative engaged state and its neutral state, since the chattering which has been previously inevitable between members that are engageable with each other, is now prevented by the present invention from occurring. Thus, the tapping efficiency of the improved tapper mechanism of the present invention is improved to a remarkable extent.

The present invention can be applied to any tapping apparatus operating in an automated machine, such as NC machine tools, wherein the apparatus can be controlled precisely in accordance with an automatic control system of the machine tool. Thus the invention contributes to a high precision of the thread formation.

BRIEF DESCRIPTION OF THE DRAWING

While the novel features of the present invention are defined in the appended claims, the invention is described in greater detail below, with reference being had in the following description to the drawing, wherein:

FIGS. 8(a) to 8(c) illustrate a further embodiment, wherein:

FIG. 8(a) is a cross-sectional front elevational view of parts in the further embodiment;

FIG. 8(b) is also a cross-sectional side elevational view of the further embodiment; and FIG. 8(c) is a cross-sectional side elevation of a modification of the further embodiment;

FIG. 9 is a cross-sectional front elevation of a prior art apparatus; and

Figure 1:
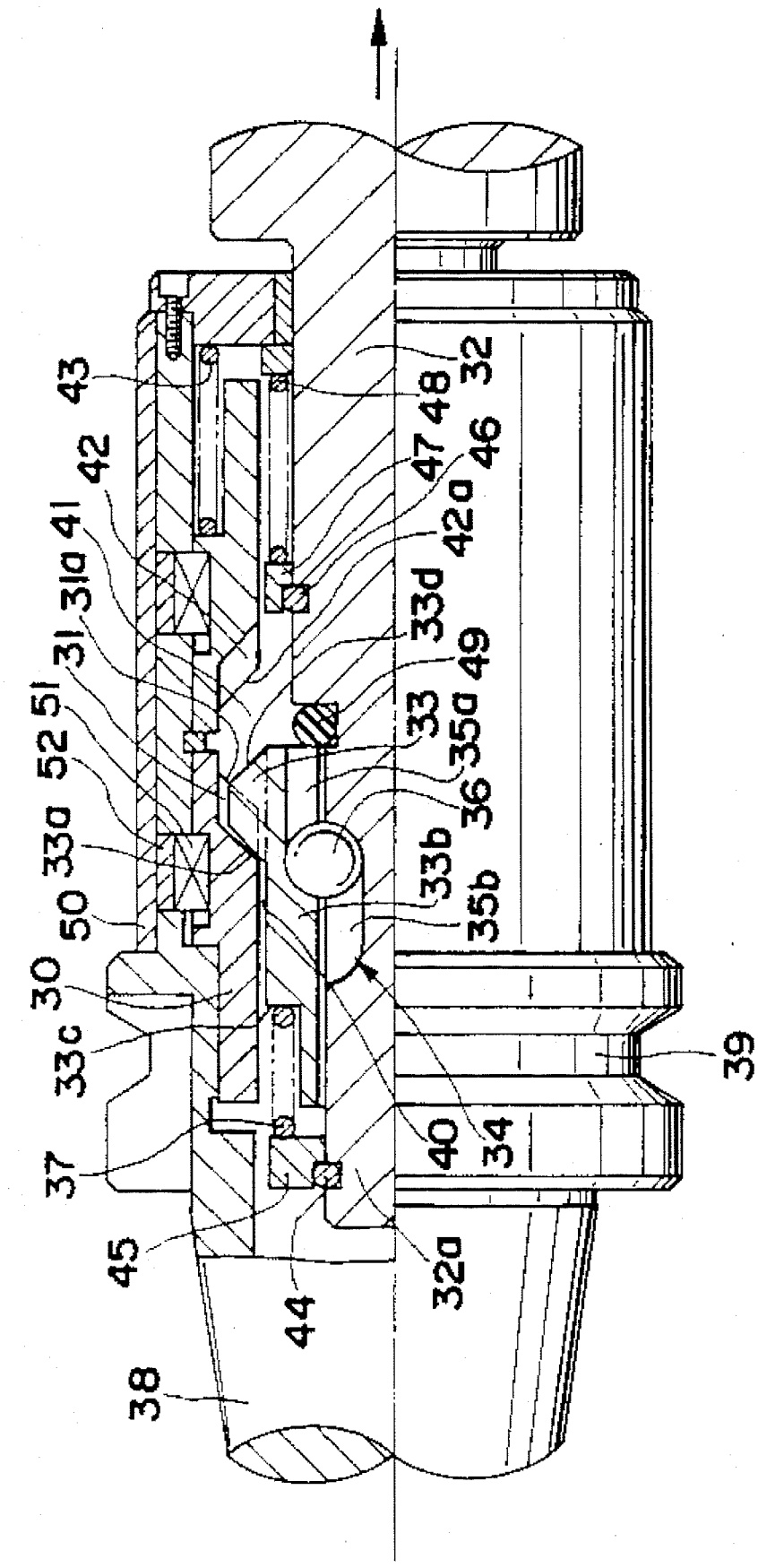
FIG. 1 is a front elevational view of an embodiment of a tapper mechanism of the present invention, shown partly in cross-section.

The schematic representations of the drawing figures do not necessarily depict the actual relative sizes or locations of the elements shown in the embodiments described below.

DETAILED DESCRIPTION OF THE PREFERRED EMBODIMENT

FIG. 1 shows an embodiment of a tapper mechanism of the present invention, having a tapper body 30, which has at its back end a shank 38 and a flange-shaped fitting 39. The shank 38 is provided for connection to a driving shaft of a machine tool (not shown), and the fitting 39 is to be gripped by a manipulator of the machine tool. A large-diameter axial bore 40 is formed in the tapper body 30, and a driven shaft 32 fits into the bore and is slidable therein.

An annular member 33b fits on the rear portion 32a of the driven shaft 32. An engageable claw 33 protrudes radially outwardly from the annular member 33b, and is axially displaceable along an outer periphery of the driven shaft 33. Both the rear end portion 32a and the annular member 33b are easy to fabricate, because the former is a round rod and the latter is a round cylinder. A forward clutch 31 is integral with an inner periphery of tapper body 30, or is integrally secured to that periphery by a fixing ring or the like, for engagement with the engageable claw 33 when it has to rotate in the normal i.e. the forward direction. The forward clutch 31 is disconnected from the engageable claw 33 when it is axially moved into a neutral free space 41 axially adjacent to and in front of the clutch. A reverse clutch 42 is disposed coaxially with and in front of the neutral space 41, for engagement with the engageable claw 33 when it has to rotate in reverse. A small buffer spring 43 supports the reverse clutch 42 so that this clutch is rotatable together with the tapper body 30 while being axially slightly displaceable therewith.

Figure 2:
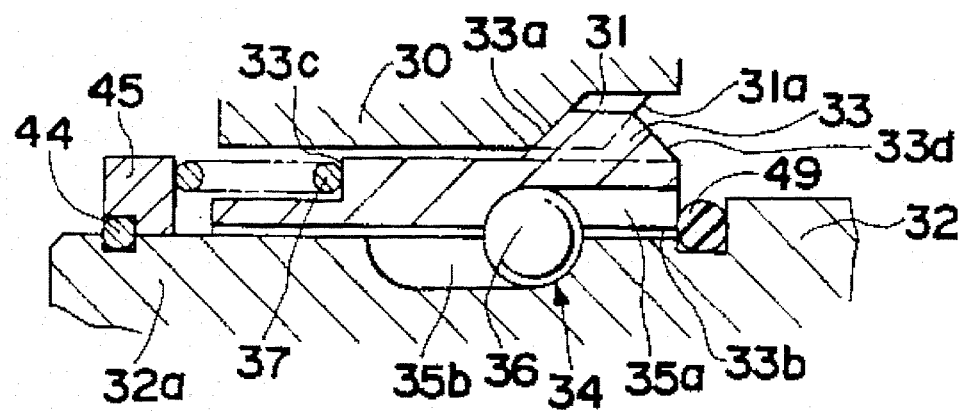
FIG. 2 is a schematic illustration of a first operating stage of essential parts in the tapper mechanism.

Axial edges 31a and 42a respectively of the forward and reverse clutches 31 and 42 are radially slanted surfaces. As also shown in FIG. 2, correspondingly, the opposite axial edges 33a and 33d of the engageable claw 33 are radially obliquely slanted. The axial edges 31a, 42a, 33a and 33d need not necessarily be straight as shown in the drawings, but could also be somewhat arcuate.

A first stopper ring 44 is secured to a periphery at the back end of the driven shaft 32. A seat 45 for a clutch spring 37 is supported by the first stopper ring 44, and the clutch spring 37 is disposed between the seat 45 and a rearward end surface 33c of the engageable claw 33. The spring 37 always urges the claw 33 in a direction away from the forward clutch 31.

A slider 34 is disposed between the driven shaft 32 and the engageable claw 33 and fitted thereon, so that they can not only rotate smoothly, but can also be rapidly displaced axially and relative to each other.

In this embodiment of the present invention, the slider 34 includes a semi-U-shaped groove 35a and a generally U-shaped groove 35b which are formed in respective opposed peripheral portions of the engageable claw 33 and the driven shaft 32. The grooves 35a and 35b have a sufficient axial length to receive a clutch ball 36 and permit it to roll axially therein. Depending on its axial position, the clutch ball 36 either forces the claw 33 to rotate together with the driven shaft 32, or it permits them to slide axially relative to each other.

A second stopper ring 46 is fixed to a peripheral portion of the driven shaft 32 and supports a seat 47 for a recovery spring 48 formed as a tension spring. The recovery spring 48 is interposed between the seat 47 and the forward end of the axial bore 40, in the tapper body, whereby the spring urges the driven shaft 32 toward its rear end.

A further seat (not shown) can selectively engage a rear end surface of the driven shaft 32, and an absorbing compression spring (not shown) disposed in the axial bore 40 of the tapper body 30. The absorbing spring between the further seat and the rear bottom of the axial bore, can desirably absorb a positional difference that might appear in an axial direction between an axially driving member in the machine tool and a tap 13 driven thereby.

A bumper ring 49 is disposed on the periphery of the driven shaft, at a region between the engageable claw 33 and the seat for the recovery spring 48. A coupling (not shown) is provided at the forward end of the driven shaft, so that a holder for the screw tap 13 shown in FIG. 9 can be removably attached to the driven shaft.

A cover 50 enclosing the tapper body 30 is connected thereto by means of keys 51 secured to the tapper body and elastic attaching members 52 such as from rubber, are mating with the keys.

In operation, the tapper body 30 is rotated as the flange-shaped fitting 39 protruding therefrom is engaged by a manipulator and the shank 38 is connected to the driving shaft of a machine tool.

As the tapper body 30 starts to rotate, the engageable claw 33 engages the forward clutch 31, this rotating the driven shaft 32 forward. The screw tap 13 held by the forward end of said driven shaft can thus tap a female thread in a predrilled starting bore previously formed in a workpiece. FIGS. 1 and 2 show the starting stage of such a tapping operation.

As shown in FIG. 1 and particularly in FIG. 2, the back end portion 32a of the driven shaft 32 has the claw 33 thereon located at its leftmost position in the drawings. The clutch spring 37 between the seat 45 secured to the shaft and the claw 33 is in its expanded state and exerts the least bias. The clutch ball 36 is shown in the drawing as being located between the leftmost end of the groove 35a in the claw 33 and the rightmost end of the groove 35b in the driven shaft 32.

Figure 3:
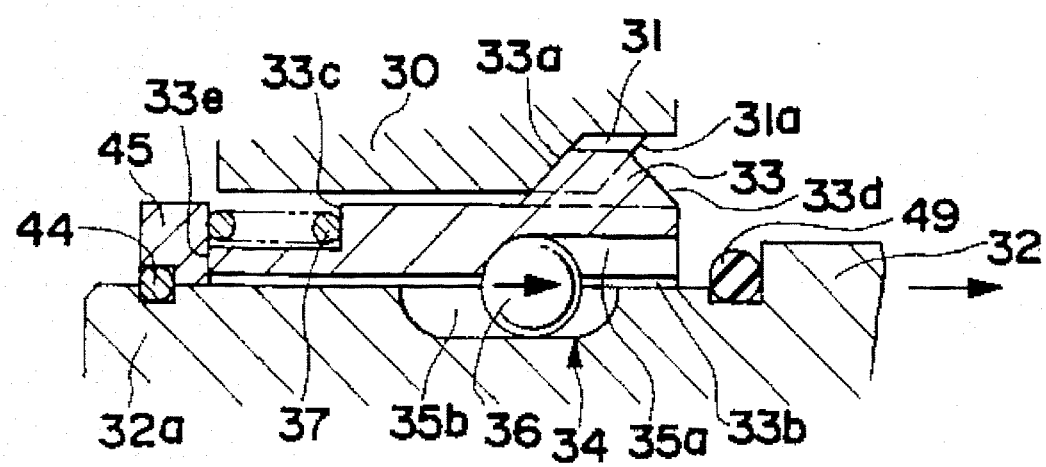
FIG. 3 schematically shows a second operating stage thereof.

In this state, the tapper body drives the driven shaft 32 through the clutch 31, the claw 33 and the ball 36, and commences the tapping operation. As seen in FIG. 3, the driven shaft is guided forward by and along the predrilled starting bore in the workpiece that is being tapped, so that the shaft 32 moves forward, i.e. to the right in the drawing. During that self-propelling stage, the clutch 31 remains in a face-to-face contact with the engageable claw 33, transmitting a sufficient force between them. However, the clutch ball 36 intervenes between the claw 33 and the driven shaft 32, thus reducing the rolling contact between them. Consequently, the shaft 32 can advance forward and independently of the claw 33. During this forward movement, the clutch spring 37 becomes compressed between the seat 45 and the claw 33, thus increasing its bias.

Figure 4:
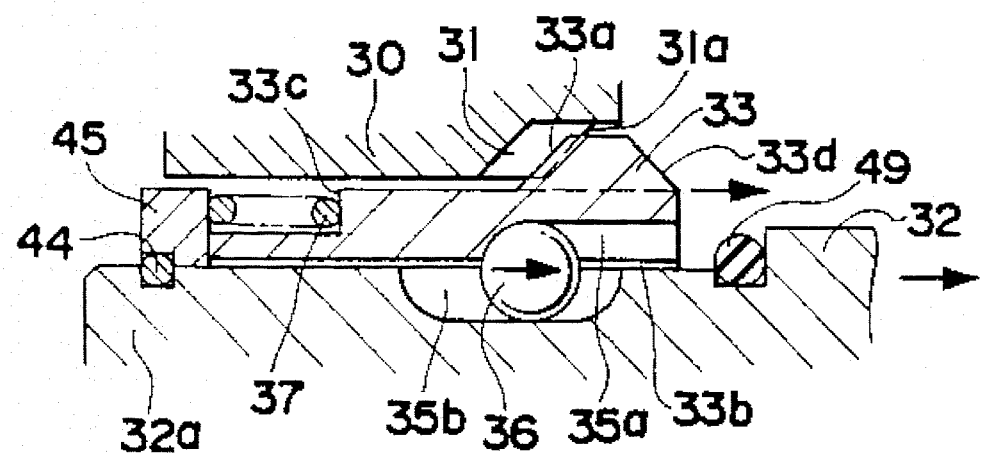
FIG. 4 schematically shows a third operating stage thereof.

As shown in FIG. 3, the driven shaft 32 continues to advance until its spring seat 45 bears against the back end 33e of the engageable claw 33, at the desired end point of the predetermined stroke of the driven shaft. The claw 33, as it moves together with the driven shaft 32, is then forced forward by a distance so that its rear edge 33a comes close to the forward edge 31a of the clutch, as shown in FIG. 4.

Figure 5:
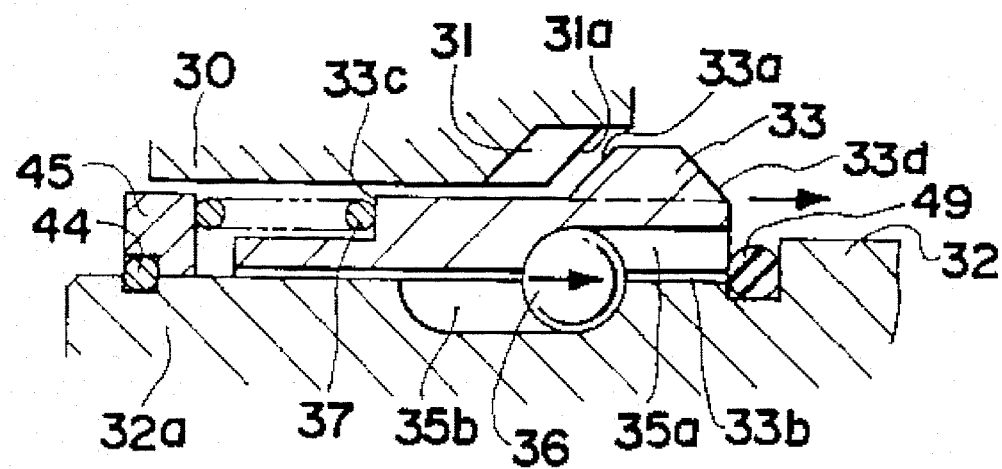
FIG. 5 schematically shows a fourth or final operating stage thereof.

As the driven shaft moves still further forward as shown in FIG. 5, the edges 33a and 31a are separated from each other, thereby disengaging the claw 33 from the clutch 31 and eliminating the contact between them. In response to this change in the relationship between these relevant members, the claw 33 makes an instant and rapid forward movement on and relative to the driven shaft 32, due to the clutch ball 36 affording a merely minimal frictional contact and due to the push from the release of bias of the clutch spring 37. Thus, the resulting certain and positive disengagement of the engageable claw 37 from the clutch 31 prevents any repeated or chattering contact between them in this phase of the operation, even when the speed of the forward moving driven shaft 32 is relatively low. In this state, the clutch ball 36 is in contact with and retained between the rear end of the groove 35a and the front end of the other groove 35b. Therefore, at such a foremost position, the engageable claw 33 can no longer move forward relative to the driven shaft. The bumper ring 49 functions as a cushion absorbing a shock which would otherwise imparted to the engageable claw 33, when it takes its foremost position.

Advantageously the clutch ball 36 needs to be displaced axially only to every slight extent, generally by a half of the differential displacement between the claw 33 and the driven shaft 32 moving relative thereto.

Figure 6:
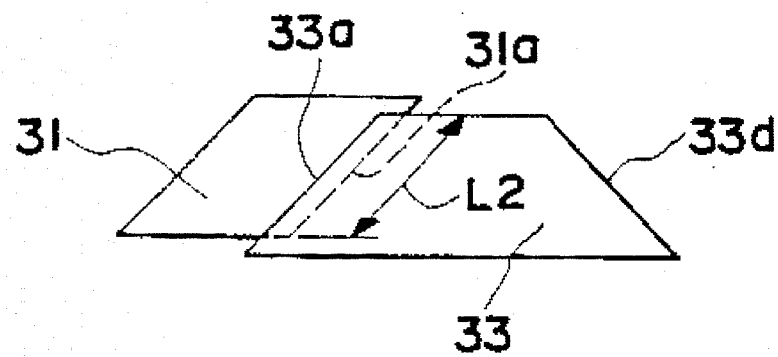
FIG. 6 schematically illustrates further essential parts of the tapper mechanism.
Figure 7:
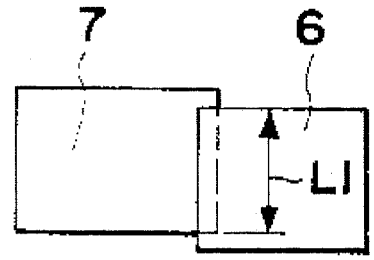
FIG. 7 schematically shows essential parts corresponding to the parts shown in FIG. 6 and included in a comparative reference example.

As shown in FIG. 6, the engageable and disengageable edges 31a and 33a of the clutch 31 and the claw 33 are radially slanted. Therefore, they can have a relatively greater engagement length $L_2$, than as shown in FIG. 7, a length $L_1$ in the case of a clutch 7 and a claw 6 that are perpendicular to the longitudinal axis of the tapper body 30. Thus, the clutch 31 has a greater contact with the claw 33, thereby reducing any local abrasion. As suggested above, the edges 31a and 33a can also be shaped somewhat arcuate and convex, rather than as straight, slanting edges.

As the tapping of the bore in the workpiece is finished, the claw 33 disengages in the aforedescribed manner from the forward clutch 31, and enters the neutral free space 41 where the transmission of torque from the tapper body 30 to the driven shaft 32 is intercepted. Subsequent to this transient, neutral state, the drive shaft of the machine tool rotates the tapper body in reverse. The reverse rotation of tapper body displaces it by a small extent toward its back end, and brings the reverse clutch 42 into engagement with the claw 33 from its previous neutral, free rotation. The driven shaft 32 thus rotates in reverse. The engageable edges 33d and 42a are also slanted in radial direction so that their abrasion is also diminished in this case.

The reverse rotating driven shaft 32 is guided outwardly through the tapped bore of the workpiece, until the screw tap 13 is completely withdrawn therefrom.

Figure 8A:
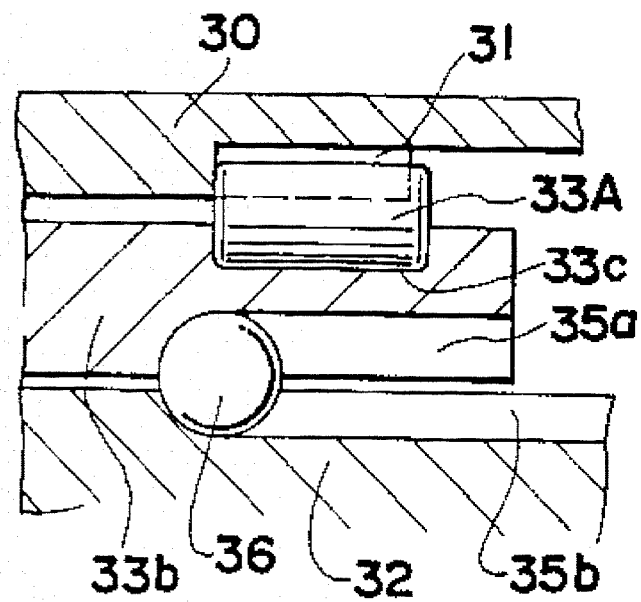
Figure 8B:
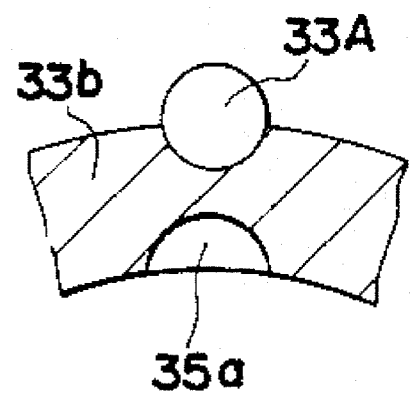
Figure 8C:
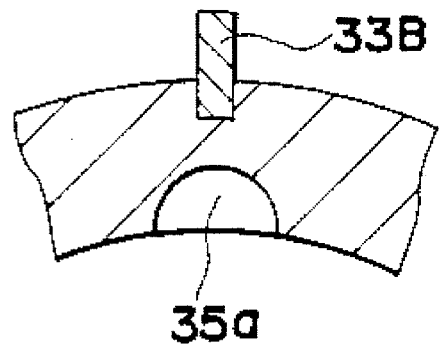

Although the engageable claw 33 is integral with the ring-shaped member 33b in the described embodiment, as shown in FIGS. 8(*a*)–(*c*), this member can alternatively have an axially extending groove 33c tightly and holding a detachable claw 33A. This detachable claw can be either a short columnar piece 33A shown in FIG. 8(*b*), or be a small plate 33B shown in FIG. 8(*c*). The detachable claw 33A or 33B, when worn, can be readily replaced with a new one. If so desired, such a detachable claw alone can be suitably made of an abrasion-resistant material.

Figure 10:
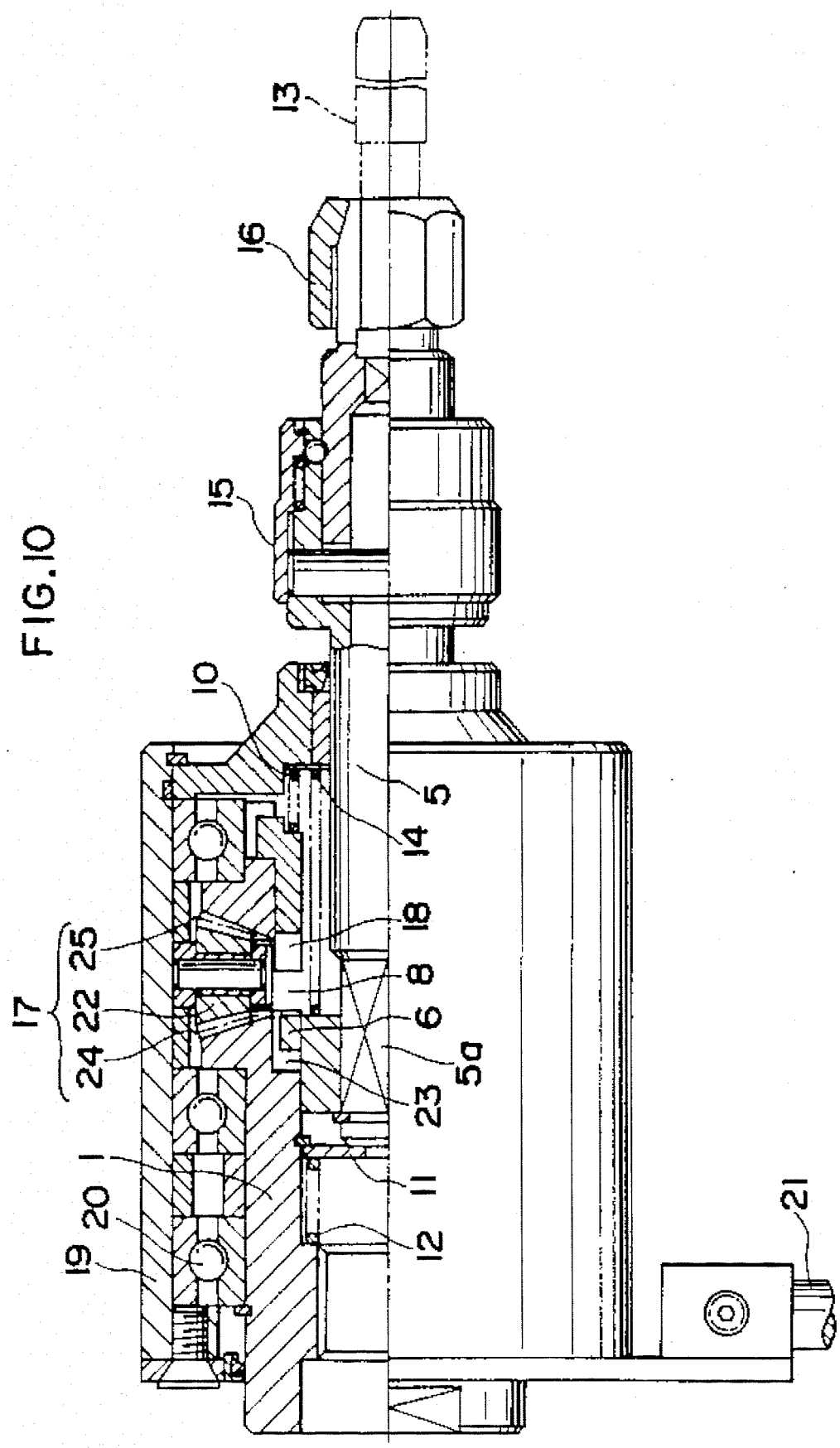
FIG. 10 is also a cross-sectional front elevation of another prior art apparatus.

As it can be readily understood from the above description, the tapper of the above described embodiments is advantageously used where the driving shaft of the machine tool is reversibly rotated, but it can also be advantageously used when, as shown in FIG. 10, the tapper has the known reversing mechanism incorporated therein.

Although the present invention is described in terms of suitable embodiments thereof, the full scope of the invention is defined by the claims.

I claim:

1. A tapper mechanism comprising:

(i) a rotatable tapper body having a clutch therein, (ii) a driven shaft having a portion rotatably held coaxially in said tapper body for limited axial motion therein, (iii) an engageable claw connected from said driven shaft for selective engagement with said driven shaft for selectively transmitting torque from said tapper body to said driven shaft, upon the axial movement of said driven shaft within said tapper body said transmission of torque from said tapper body to said driven shaft is interrupted by the disengagement of said clutch and said driven shaft is axially moved into a neutral state of rotation, (iv) a tap connected from an end of said driven shaft that is remote from said tapper body, (v) an engaging slider disposed between said driven shaft and said engageable claw, said engageable claw and said driven shaft being adapted to rotate together and are being axially displaceable relative to each other within said tapper body during such rotation, and (vi) a clutch spring urging said engageable claw away from said clutch.

2. The tapper mechanism of claim 1, wherein said engageable claw and said driven shaft have surfaces opposing each other, an axial groove in each of said opposing surfaces with said grooves substantially facing each other, and said engaging slider comprises a clutch ball within said opposing grooves for axially rolling in said grooves within said tapper body for enabling sliding movement between said engaging claw and said driven shaft.

3. The tapper mechanism of claim 1, said clutch and said engaging claw having opposing contact edges that are engageable with each other.

4. The tapper mechanism of claim 3, wherein said opposing edges are radially complimentarily slanted for increasing the length of said contact edges.

5. The tapper mechanism of claim 3, wherein said opposing edges are complementarily curved for increasing the length of said contact edges.

6. The tapper mechanism of claim 1, further comprising means for limiting the axial movement of said engageable claw, said means for limiting including a cushioning member for cushioning the impact of the limiting of said axial movement.

7. The tapper mechanism of claim 1, wherein said engageable claw is selectively attached from said driven shaft.

* * * * *